(12) United States Patent
Komine et al.

(10) Patent No.: US 7,661,539 B2
(45) Date of Patent: Feb. 16, 2010

(54) LIQUID FILTRATION DEVICE

(75) Inventors: Akiyoshi Komine, Yokohama (JP); Mitsunobu Okamoto, Yokohama (JP)

(73) Assignee: Yamashin-Filter Corp., Kanagawa (JP)

( * ) Notice: Subject to any disclaimer, the term of this patent is extended or adjusted under 35 U.S.C. 154(b) by 339 days.

(21) Appl. No.: 11/592,796

(22) Filed: Nov. 3, 2006

(65) Prior Publication Data

US 2007/0102336 A1 May 10, 2007

Related U.S. Application Data (60) Provisional application No. 60/733,508, filed on Nov. 3, 2005.

(51) Int. Cl.
*B01D 35/28* (2006.01)
*B65D 90/22* (2006.01)
*F16K 11/07* (2006.01)
*B01D 35/00* (2006.01)

(52) U.S. Cl. .................. 210/436; 210/120; 210/472; 220/750; 220/495.04; 220/203.07; 137/625.48

(58) Field of Classification Search .................. None
See application file for complete search history.

(56) References Cited

U.S. PATENT DOCUMENTS

| | | | |
|---|---|---|---|
| 1,642,864 A | 9/1927 | Williams | |
| 2,028,062 A | 1/1936 | Goldman | |
| 2,360,020 A | 10/1944 | Skinner et al. | |
| 2,382,278 A | 8/1945 | Widmann | |
| 2,439,936 A | 4/1948 | Kasten | |
| 2,804,211 A | 8/1957 | Kennedy | |
| 2,833,415 A | 5/1958 | Wilkinson | |
| 3,225,929 A | 12/1965 | Sicard | |
| 3,332,554 A | 7/1967 | Humbert, Jr. | |
| 3,390,778 A | 7/1968 | Uhen | |
| 3,502,218 A | 3/1970 | Tuffnell et al. | |
| 3,912,633 A | 10/1975 | Delaney | |
| 3,923,663 A | 12/1975 | Reid | |
| 4,465,595 A | 8/1984 | Cooper | |
| 5,084,162 A | 1/1992 | Conti | |
| 5,102,543 A * | 4/1992 | Burroughs | 210/282 |
| 5,171,430 A | 12/1992 | Beach et al. | |
| 5,468,386 A | 11/1995 | Ardes | |
| 5,520,800 A | 5/1996 | Glebovsky et al. | |
| 5,681,461 A | 10/1997 | Gullett et al. | |
| 5,695,636 A | 12/1997 | Gullett | |
| 5,698,098 A | 12/1997 | Ernst et al. | |
| 5,762,788 A | 6/1998 | Gullett | |
| 5,814,215 A | 9/1998 | Bruss et al. | |
| 5,879,544 A * | 3/1999 | Cassidy | 210/90 |
| 5,984,109 A | 11/1999 | Kanwar et al. | |

(Continued)

*Primary Examiner*—Krishnan S Menon
*Assistant Examiner*—Benjamin Kurtz
(74) *Attorney, Agent, or Firm*—Brinks Hofer Gilson & Lione (57) ABSTRACT

A liquid filtration device that efficiently filters a filter element and vents pressurized vapors from inside the filter element. The liquid filtration device is comprised of a vent valve apparatus that is furnished within the main body of the filter head and a plug which is located on the filter housing. The main body has a first opening that is located on the outside of the filter housing, a second opening that communicates with the inside of the filter element, an opening that communicates with the second opening and the first opening and a third opening. The third opening permits communication between the filter element and the filter housing as well as between space and the passage found within the third opening. The plug is installed within this passage, and can move between a first position that does not vent pressurized vapors that are within the housing and a second position that vents pressurized vapors that are within the housing.

5 Claims, 6 Drawing Sheets

U.S. PATENT DOCUMENTS

| | | |
|---|---|---|
| 6,006,924 A | 12/1999 | Sandford |
| 6,024,229 A | 2/2000 | Ayers |
| 6,139,738 A | 10/2000 | Maxwell |
| 6,159,366 A | 12/2000 | Carroll |
| 6,258,269 B1 | 7/2001 | Knight |
| 6,485,637 B2 | 11/2002 | Jainek et al. |
| 6,488,845 B1 | 12/2002 | Neufeld et al. |
| 6,500,335 B2 | 12/2002 | Janik et al. |
| 6,540,909 B2 | 4/2003 | Smith et al. |
| 6,540,914 B1 | 4/2003 | Smith |
| 6,572,768 B1 | 6/2003 | Cline et al. |
| 6,610,203 B1 | 8/2003 | Jainek |
| 6,634,509 B2 | 10/2003 | Ochi |
| 6,706,181 B1 | 3/2004 | Baumann et al. |
| 6,709,588 B2 | 3/2004 | Pavlin et al. |
| 6,758,980 B2 | 7/2004 | Prater et al. |
| 6,790,356 B2 | 9/2004 | Wright et al. |
| 6,863,184 B2 | 3/2005 | Ochi et al. |
| 6,896,803 B2 | 5/2005 | Cline et al. |
| 6,936,169 B2 | 8/2005 | Baumann et al. |
| 6,960,296 B2 | 11/2005 | Morita |
| 2004/0144734 A1 | 7/2004 | Suzumori et al. |
| 2005/0077253 A1 | 4/2005 | Sugiura et al. |
| 2005/0178713 A1 | 8/2005 | Stockbower |
| 2005/0178714 A1 | 8/2005 | Stockbower |

\* cited by examiner

LIQUID FILTRATION DEVICE

RELATED APPLICATIONS

Pursuant to 35 U.S.C. § 119(e), this document claims the benefit of the filing date of Provisional U.S. Patent Application Ser. No. 60/733,508 filed on Nov. 3, 2005, which is incorporated by reference herein.

TECHNOLOGICAL FIELD

The invention disclosed herein pertains to a liquid filtration device that filters liquid circulating in a hydraulic and/or transmission circuit of the hydraulic pressure apparatus which has, for instance, a hydraulic oil actuator.

BACKGROUND

An apparatus that has an actuator such as a hydraulic pressure cylinder has a filtration device in order to filter liquid, such as hydraulic and/or transmission oil, that circulates in a hydraulic pressurized circuit. The filtration device has a housing and a filter element in the housing which filters hydraulic and/or transmission fluid.

The filtration device is equipped with a vent valve apparatus that vents air that is trapped within the housing depressurizing and forcing air to the outside of the housing.

The vent valve apparatus is installed directly in the housing, and vents air that is trapped in between the housing and the filter element.

If the filter element has filtration material in the shape of, for instance, a tube and filters hydraulic oil when the oil passes the filtration material (filter media) between the inner side and outer side thereof, the filtration material will also be trapped inside the filter element.

Furthermore, in this type of filtration device, air may be trapped both in the gap between the filter element and the housing and inside the filter element.

However, while the vent valve apparatus of the aforementioned type can vent the air that is trapped in the space defined between the housing and the filtration material, air trapped inside the filter element will not be vented.

Furthermore, when exchanging the filter element, before the housing is opened, the hydraulic oil that remains within the housing is drained, via a drain valve. When this occurs, air flows into the housing by opening the vent valve, which in turn causes the hydraulic liquid to flow out of the filter housing.

However, if the filter element is tubular, it is difficult for air to flow into the inside of the filter element due to the filter material's resistance. Consequently, it is difficult to drain the hydraulic oil that remains inside the filter element.

Therefore, one objective of this invention is to provide a filtration device that vents air trapped inside the filter element and efficiently drains liquid from the inside of the filter element.

BRIEF SUMMARY

As disclosed herein, a filtration device has a filter element, a housing and a vent valve apparatus. The filter element is made tubular and has an annulated wall section. The filter element filters liquid to be filtered by passing the liquid through said wall such that the liquid passes between the inner side and outer side of the wall. The filter element is held within the housing. A vent valve apparatus drains the liquid within the housing.

In one embodiment, the vent valve apparatus has a main body, a plug and a O-ring seal structure. The main body has a first opening that communicates with the outside of the housing and a second opening that communicates with the inside of the filter element. The main body further includes a first passage that communicates with the first opening and the second opening, and a third opening that communicates with the first passage and a space defined between the filter element and the housing. The plug is placed in the passage so as to be movable between a first position in which it does not vent air trapped in housing, and a second position in which it vents air from within the filter housing. In one embodiment, the plug has a second passage that communicates, when the plug is in the second position, between the second opening and the third opening and that communicates with the outer side of the housing through the first opening. The seal structure, when the plug is in the first position, provides a seal between the outside of the housing and the inside of the filter element and between the outer side of the housing and the space between said housing and said filter element. The seal formed by the seal structure may be in some cases an air-tight seal.

The embodiment disclosed above may simultaneously vent the air trapped between the filter element and the housing and the air trapped inside of the filter element. Consequently, this decreases the amount of time to vent air trapped inside of the housing.

As communication may be established between the outside of the housing and each of the inside of the filter element and the space between the filter element and the housing, even when liquid inside the housing is drained, air can be supplied to the inside of the filter element.

In another embodiment, the filtration device has a positioning mechanism that positions the plug into the first venting position. In this embodiment, the plug is prevented from moving to the second position when the filtration device is utilized.

In another embodiment, the positioning mechanism has an urging member, a first contact section, and a second contact section. The urging member forces the plug from the second venting position towards the first venting position. The first contact section is provided in the plug and the second contact section is provided in the main body. The second contact section is in contact with the first contact section in the urging direction of the urging member when the plug is in the first venting position. In this embodiment, the plug is pushed opposite the urging direction to move the plug into the second venting position.

In another embodiment, a retention mechanism is provided to retain the plug in the second venting position when the plug is in the second venting position. In one embodiment, the retention mechanism has a groove that is formed in the outer per surface of the plug and also has an engaged section that is provided in the main body and detached in the groove.

With this air vent within the filtration device, air trapped inside the housing can be vented in a short amount of time and liquid can be efficiently drained.

BRIEF DESCRIPTION

DETAILED DESCRIPTION

Figure 1:
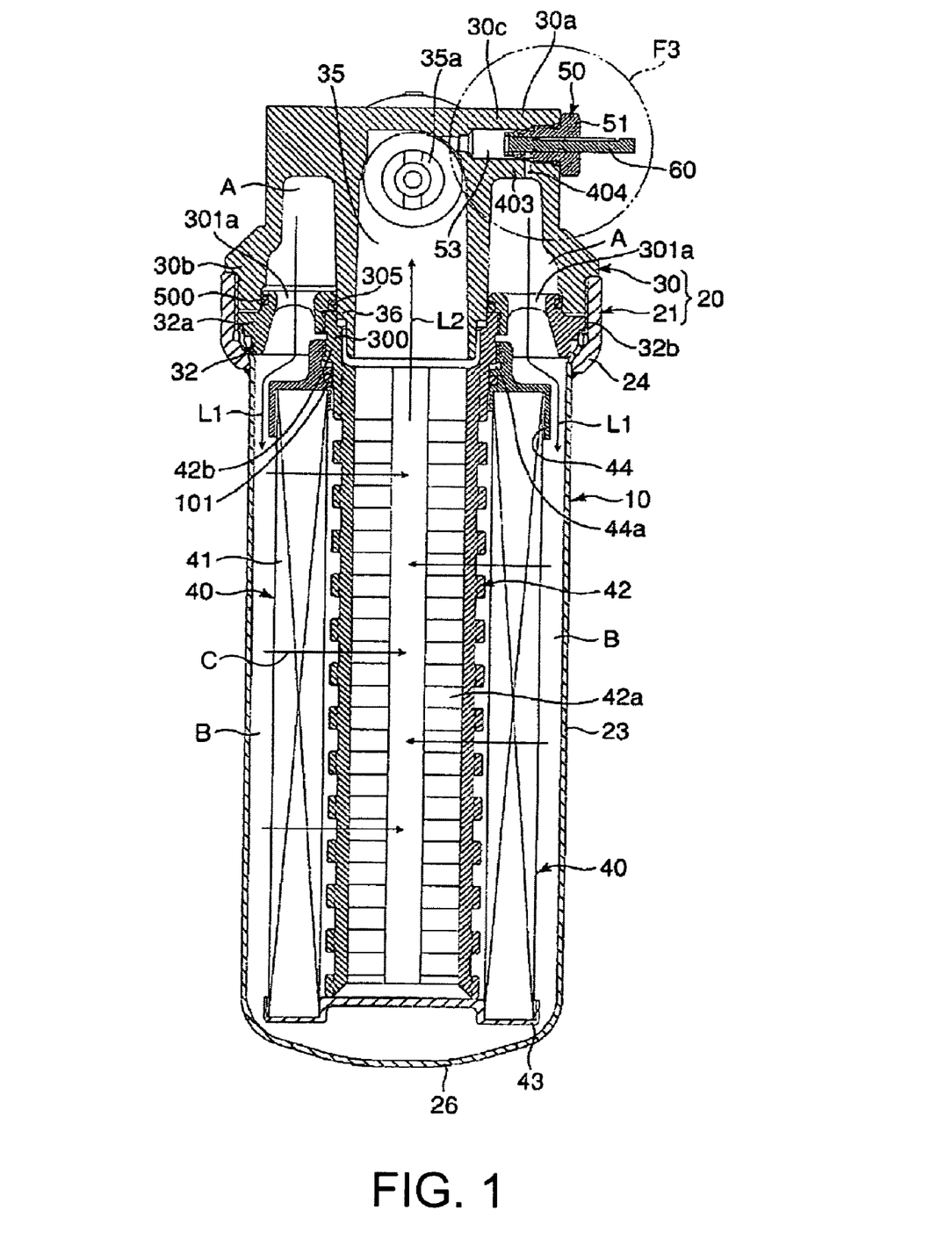
FIG. 1 is a cross sectional view of the filtration device.

The filtration device according to the first embodiment of the present invention will be discussed with reference to FIGS. 1-7. FIG. 1 is a cross sectional view of filtration device 10. The filtration device 10 may be installed in a hydraulic and/or transmission pressurized circuit of a construction machine with a hydraulic actuator. Hydraulic oil runs in the hydraulic pressurized circuit.

The hydraulic pressurized circuit has an outflow section and an inflow section. Hydraulic oil L1 that has been filtered flows into the filtration device 10 from the outflow section. The filtered hydraulic liquid is returned to the hydraulic pressure circuit through the inflow section. The hydraulic oil L1 to be filtered is unfiltered hydraulic oil which is about to enter the hydraulic and/or transmission filter device 10.

Figure 2:
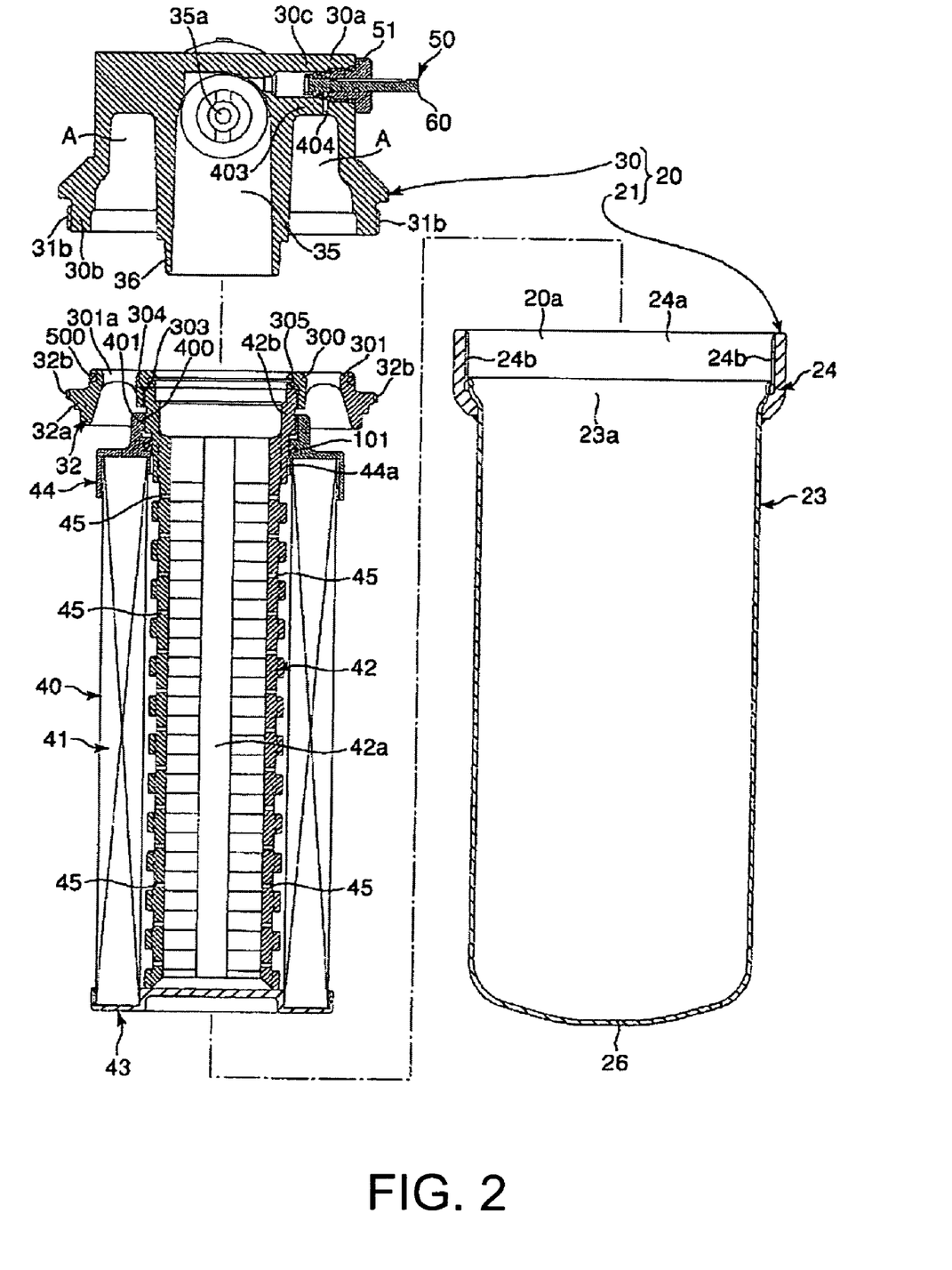
FIG. 2 is a cross sectional view of the disassembled filtration assembly as illustrated in FIG. 1.

FIG. 2 is a cross sectional view that illustrates the disassembled hydraulic and/or transmission filtration device 10. As illustrated in FIGS. 1 and 2, the hydraulic and/or transmission filtration device 10 is equipped with a housing 20, a filter element 40 and a vent valve apparatus 50.

The filtration device's housing 20 is equipped with a housing body 21 and a head 30, and the housing body 21 is equipped with a first member 23 and a second member 24.

The first member 23 may be, for example, a tubular member with one end substantially closed. The second member 24 may be, for example, a tubular member that has the inner surface substantially identical to the inner surface of the first member 23. Both ends of the second member 24 are open.

The opening end 23*a* of the first member 23 and one opening end 24*a* of the second member 24 may be connected, for example, by welding so that the inner surfaces are flush with each other. Consequently, the housing body 21 is made tubular with one end substantially closed and the other end which is open.

A head 30 has an influx passage (not illustrated) and an outflow passage 35. The inflow passage is connected to the outflow section of the hydraulic pressurized circuit. The hydraulic oil L1 to be filtered flows into the hydraulic and/or transmission filtration device 10 through the inflow passage.

The head 30 is formed in its center with a projection section 36. The projection section 36 is projected toward the filter element 40 that is attached to the head 30.

One part of the outflow passage 35 is formed within the projection section 36. One end of the outflow passage 35 opens to the top of projection section 36. As illustrated in FIG. 1, the other end 35*a* of the outflow passage 35 is connected to the inflow section of the hydraulic pressurized circuit.

As illustrated in FIG. 2, space A is defined between the projection section 36 and a surrounding wall 30*b* of the head 30. The space A communicates with the inflow passage into which the hydraulic oil L1 entering the filtration device 10 flows. The surrounding wall 30*b* is made, for instance, tubular and fits tightly in the opening end 24*a*. The outer surface(s) of the surrounding wall 30*b* is formed with a male thread 31*b*. The inner surface of the opening end 24*a* is formed with a female thread section 24*b*. The head 30 and the housing body 21 fit together by tightening the male thread 31*b* and female thread 24*b*.

The projection section 36 of the head 30 is projected into the housing body 21 when the housing body 21 and the head 30 are assembled. As seen from the schematic, section 36 is positioned concentrically with the housing body 21.

The filter element 40 is received in the housing body 21 from an opening 20*a* of the housing body 21 (the opening end 24*a* of the second member 24). The filter element 40 has a filter member 41, an inner tubing 42, a first support member 43, a second support member 44 and an element holding member 32.

The filter member 41 is made with a resin and is formed in pleats and rounded into a tubular shape. As used herein, the filter member 41 is the wall section of the filter element 40. The inner tube 42 is made tubular, the circumference of which is formed with multiple holes 45 that penetrate into the diameter directions of the circumference.

The inner tube 42 is accommodated inside the filter member 41. The top of the inner tube 42 protrudes higher than the top of the filter component 41. The inner tube 42 is positioned concentrically with the filter member 41. When the filter member 41 is pushed towards the inside, the inner tube 42 supports the filter member 41 in contact with the filter member 41 and keeps the filter component 41 from being deformed towards the inside.

The first support member 43 supports the bottom of the filter member 41 and the bottom of the inner tube 42.

The second support member 44 supports the top of the filter member 41 and the top section 42*b* of the inner tube 42. The second support member 44 is formed with a fitting hole 44*a* into which the top section 42*b* fits. An O-ring 101 is placed between the surface of the fitting hole 44*a* and the top section 42*b*.

The O-ring 101 provides an air-tight seal between the top section 42*b* and the surface of the fitting hole 44*a*. A male thread section 400 is formed on the outer surface of the top section 42*b*. A female thread section 401 is formed on the inner surface of the fitting hole 44*a*. The inner tube 42 is fixed to the section support component 44 by screwing the male thread section 400 to the female thread section 401.

The element holding member 32 is a member that secures the filter element 40 to the filter housing body 21 so that said filter element 40 does not escape from within the housing body 21. The filter element holding member 32 is attached to the top section 42*b*.

The element holding member 32 has a main section 300 that is fixed to the top section 42*b*, and an extension section 301 that extends towards the circular direction of the top section 42*b*.

The main section 300 is tubular in construction of which the top section 42*b* fits. A female thread 303 is formed on the inner surface of the main section 300. A male thread section 304 to fit the female thread 303 is formed on the outer surface of the top section 42*b*. The male thread 304 is formed on a section of the top section 42*b* which extends outwardly further from the second support member 44. The main section 300 is fixed to the top section 42*b* by fitting the male thread section 304 and the female thread section 303.

The top of the protruding section 36 fits inside the main section 300 on the side opposite to the side on which the top section 42*b* is fixed. An O-ring 305 is provided on the inner surface of the main section 300 which provides an air-tight seal between the protruding section 36 and the inner surface(s) of the main section 300. Therefore, the inside 42a of the inner tube 42 and the outflow route 35 communicate with each other.

An extension section 301 is formed as a unitary body with the external surface of the main section 300. As illustrated in FIG. 1, the extension section 301 extends so as to reach the inner surfaces(s) of the second component 24 of the housing body 21, when the filter element 40 is placed within the housing body 21. The extension section 301 is comprised of many holes 301a that communicate with space A.

A male thread 32b is formed on the outer surface 32a of the extension part 301. The element holding member 32 is fixed to the second member 24 by the male thread 32b fitting into a female thread 24b.

When the filter element 40 is placed within the housing body 21, the male thread 32b is fitted with the female thread 24b to secure the filter element 40 inside the housing body 21.

By screwing the filter element 40 and the housing body 21 so that they are fixed together as a unit, and by screwing the male thread 31 to the female thread 24b and attaching it to the head 30, the protruded section 36 fits inside of the main section 300. This construction allows the outflow passage 35 and the inside 42a of the inner tube 42 to communicate with each other through the main section 300.

Further shown in FIG. 1 is that part of the outer surface(s) 32a opposes the inner surface surface of the surrounding wall 30b of the head 30. An O-ring 500 is placed around the section of the outer surface 32a that opposes the surrounding wall 30b of the head 30. The O-ring 500 provides a liquid-tight seal between the outer surface 32a and the surrounding wall 30b.

As the filter element 40 is constructed as previously described, the shape of the filter element 40 is cylindrical in shape. The hydraulic oil L1 to be filtered, after passing through the inflow passage and a space A, reaches the outside of the filter member 41.

A space B is formed between the filter element 40 and the housing 20 which is large enough for the hydraulic oil L1 to flow through. This space B is also formed between the first support member 43 and the closed end 26 of the housing body 21. The space B communicates with the space A through the penetration holes 301a.

Figure 3:
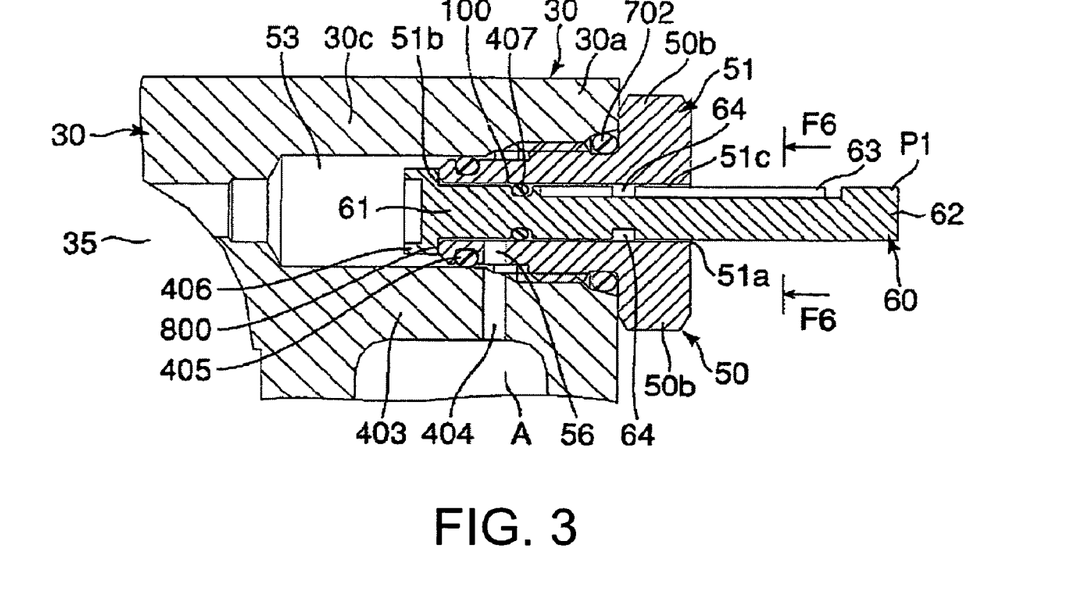
FIG. 3 is a cross sectional, enlarged view that illustrates an F3 range as illustrated in FIG. 1.

The air vent valve apparatus 50 is located in the top section 30a of the head 30. FIG. 3 is an enlarged cross sectional view that illustrates the range F3 illustrated in FIG. 1. As illustrated in FIG. 3, the vent valve apparatus 50 has a body 51 and a plug 60.

Figure 4:
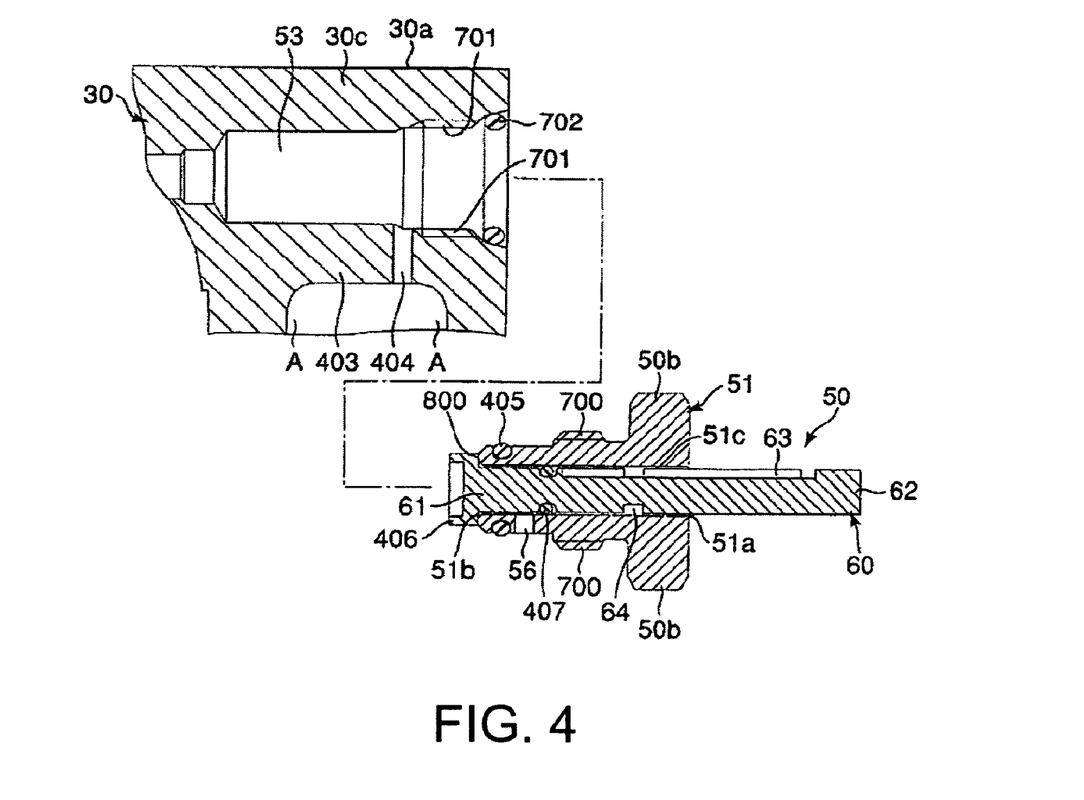
FIG. 4 is a cross sectional view that illustrates the disassembled state of the venting device as illustrated in FIG. 3.

FIG. 4 is a cross sectional diagram that illustrates the disassembled vent valve apparatus 50. As illustrated in FIG. 4, the body 51 is cylindrical in shape. The body 51 is provided from the outside of the head 30 to the inside of the outflow passage 35. A top wall section 30c of the head 30 has a receiving hole 53 which receives the body 51. The receiving hole 53 penetrates the top wall section 30c of the head 30 from the outside to the inside of the outflow passage 35.

Consequently, the receiving hole 53 is separated from the space A by the existence of a partition section 403. The partition section 403 is formed with a penetration hole 404, which penetrates the partition section 403 and allows the receiving hole 53 to communicate with the space A.

A stopper section 50b is formed at the top end of the body 51. The stopper section 50b extends outwardly from the receiving hole 53. The stopper section 50b extends in the direction of the circumference of the section of the body 51 which is received in the receiving hole 53. Thus, the cross section of the body 51 may be made T-shaped.

A male thread section 700 is formed in the outer surface(s) of the body 51. A female thread section 701 is formed in the inner periphery of the receiving hole 53 on the opening end side thereof. The body 51 is received in the receiving hole 53 such that the stopper section 50b is in contact with the outer periphery of the head 30, and is fixed to the head 30 by screwing the male thread section 700 to the female thread section 701.

An O-ring 702 is located in the inner surface of the receiving hole 53 near the opening end thereof such that it avoids the female thread 401. As illustrated in FIG. 3, the O-ring 702 provides an air-tight seal between the inner surface of the receiving hole 53 and the outer surface of the body 51. The other end of the body 51 extends so as to close the penetration hole 404.

The first opening section 51a of the body 51 opens to the outside of the head 30. The second opening section 51b of the body 51 opens inside the receiving hole 53. The first opening section 51a and the second opening section 51b communicate with each other. The inside of body 51 functions as a passage section 51c, which constitutes the first passage of the present invention.

Therefore, the outflow passage 35, which may also be the inside 42a of the inner tube 42, communicates with the outside of housing 20 through the second opening section 51b and passage section 51c, as well as the first opening section 51a.

The third opening section 56 is formed in the body 51 so as to face the penetration hole 404. An O-ring 405 is placed on the outer surface of the body 51 between the third opening section and the other end (the end opposite to the stopper section 50b). The O-ring 405 provides an air-tight seal between the inner surface of the receiving hole 53 and the outer surface of the body 51.

The third opening section 56 communicates with the passage section 51c, which allows the space A to communicate with the passage section 51c through the penetration hole 404 and the third opening section 56.

The plug 60 is formed so as to extend in one direction and fits in the passage section 51c of body 51.

One end 61 of the plug 60 goes through passage section 51c into the receiving hole 53. Formed in the one end 61 is a stopper section 406 against the surface of the second opening 51b. The stopper section 406 expands in the direction of the circumference of the plug 60. Since the stopper section 406 abuts against an end face 800 of the body 51 which is located on the side of the second opening 51b, the plug 60 will not come out from the inside section 51c to the outside of housing 20.

An O-ring 407 is placed on the outer surface of the body 51 at a location closer to the first opening section 51b than to the third opening section 56 when the stopper section 406 is in butted up against the surface of the second opening section 51b. The O-ring 407 provides an air-tight seal between the outer surface of the plug 60 and the inner surface surface of the body 51.

Figure 6:
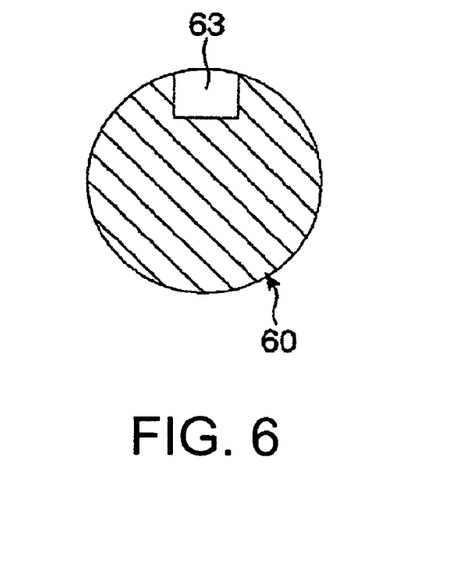
FIG. 6 is a cross sectional view taken along the line F6-F6 as illustrated in FIG. 3.

A first groove 63 is formed in the outer surface of the body 51 at a location closer to the other end 62 than to the O-ring 407. The first groove 63 extends in the sliding direction of plug 60. FIG. 6 is a cross sectional view taken from line F6-F6 illustrated in FIG. 3 and illustrates the first groove 63.

The second groove 64 is formed in the body 51 at a location closer to the other side section 62 than to the O-ring 407. The second groove 64 is annulated in the circumferential direction of the body 51. The first groove 63 and the second groove 64 intersect.

The plug 60 slides into the receiving hole 53 between a first position P1 and a second position P2.

The first position P1 is a position that air is not vented from within housing 20 to the outside of the housing 20. More specifically, the first position P1 is, as illustrated in FIG. 3, is a position in which the stopper section 406 is in abutment with the surface of the second opening section 51b.

When the plug is in the first position P1, since the passage section 51c is closed by the inner surface of the passage section 51c and the O-ring 407, air trapped in the space A and the space B, as well as in the inflow passage 35, is not vented outside of the filter housing 20.

Furthermore, when the plug is in the first position P1, the second opening 51b is closed air-tightly by the stopper section 406 being in abutment with the second opening 51b. The third opening 56 is also closed air-tightly by the outer surface of the plug 60. Therefore, it is closed air-tightly between the second opening 51b and the third opening 56.

Accordingly, the O-ring 407 and the inner surface surface of the passage 51c, as well as the plug 60 and the stopping section 40, constitute a seal structure 100 of the present invention.

Figure 5:
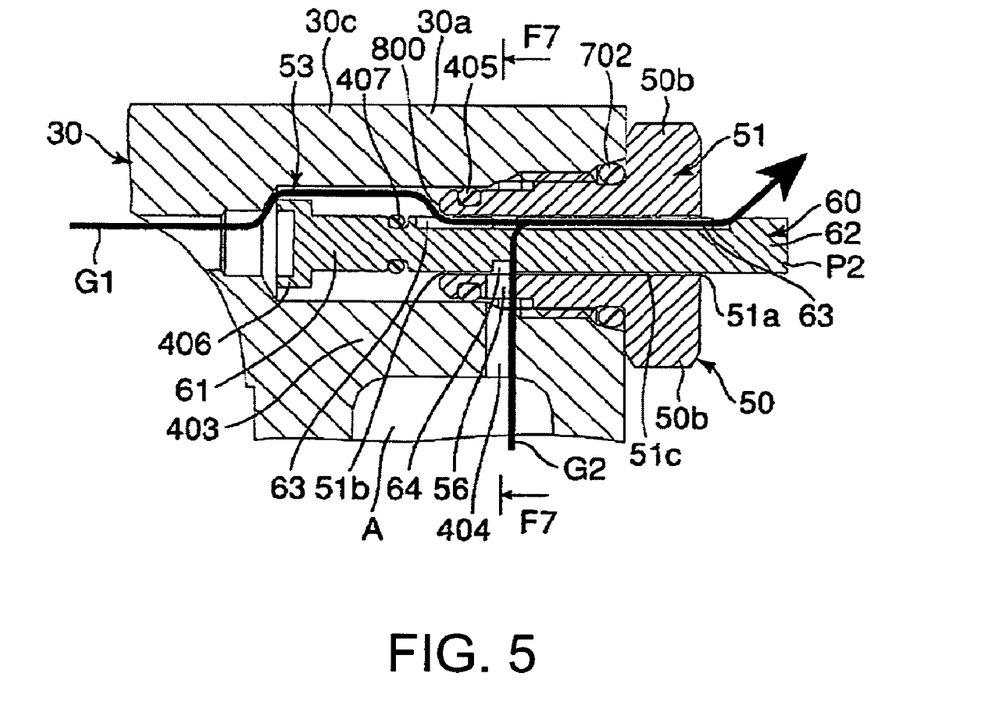
FIG. 5 is a cross sectional view of the vent valve apparatus that illustrates the state in which the plug is in the second position P2 as illustrated in FIG. 3.

FIG. 5 is a cross sectional view of the vent valve apparatus 50 when the plug 60 is in the second position P2. The second position P2 is, as illustrated in FIG. 5, a position in which air is vented from housing 20.

The second position P2 is a position in which the second groove 64 opposes the third opening 56. The length of the first groove 63 will be explained below in detail.

When plug 60 is in the second position P2, one end of the first groove 63 extends beyond the passage section 51c to thereby communicate with the receiving hole 53. Furthermore, when plug 60 is in the second position P2, the other end of the first groove 63 extends so as to communicate with the outside of head 30 or extends outside the head 30.

Figure 7:
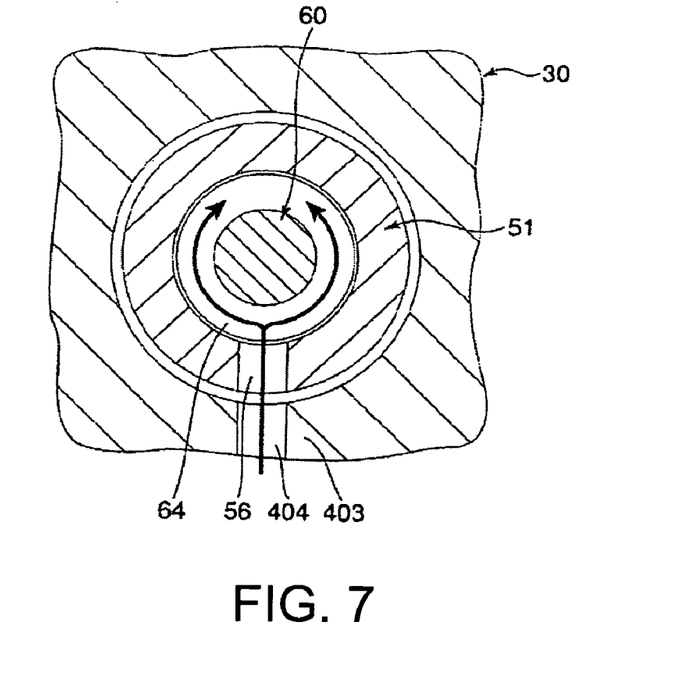
FIG. 7 is a cross sectional view taken along the line F7-F as illustrated in FIG. 5.

FIG. 7 is a cross sectional view taken from line F7-F7 of FIG. 5. FIG. 7 illustrates the cross sections of the third opening 56, the second groove 64 and the first groove 63 when the plug is in the second position P2.

As illustrated in FIG. 5 and FIG. 7, when the plug 60 is in the second position P2, the outflow passage 35 communicates with the outside of the housing 20 through the receiving hole 53 and the groove 63. Moreover, the space A communicates with the outside of housing 20 through the penetration hole 404, the third opening section 56, and the second groove 64, as well as the first groove 63. As used herein, the first and second grooves 63 and 64 constitute the second passage section of the present invention.

Accordingly, when the plug 60 is in the second position P2, air trapped inside the outflow passage 35 such as air G1, and air trapped in the spaces A and B, such as air G2, are vented outside of the housing 20.

Referring back to FIG. 1, in the filtration device 10 so constructed, the hydraulic oil L1 to be filtered flows into the influx passage of the head 30 through the outflow section of the hydraulic pressure circuit. The hydraulic oil L1 flows into the space B through the inflow passage and the space A.

The hydraulic oil L1, when reaching the outside of the filter member 41, as illustrated by the arrows C, is filtered when passing through filter member 41. The hydraulic oil L2 that has been filtered by the filter member 41 passes through the penetrating hole 45 of the inner tube 42 into the inside of the inner tube 42. Then, the filtered hydraulic oil L2 flows into the inflow section of the hydraulic pressure circuit through the outflow passage 35 and returns to the hydraulic pressure circuit. While the filtration device 10 is filtering the hydraulic oil L1 to be filtered, the plug 60 is pushed into the first position P1.

When air trapped in the housing 20 is vented outside the housing 20, the plug 60 is pulled so as to move to the second position P2. When plug 60 is moved in the second position P2, air G1 in the outflow passage 35 and air G2 trapped in the spaces A and B are vented outside the housing 20.

When the filter element 40 is exchanged and when the hydraulic oil trapped in the housing 20 is vented outside of housing 20 by a drain valve (not illustrated), the plug 60 is moved to the second position P2.

When the plug 60 moves to the second position P2 to drain the hydraulic oil L1 and L2, the inside 42a of the inner tube 42 and the outside of the housing 20 communicate with each other, thus, air flows into the inside 42a of the inner tube 42. Therefore, the hydraulic liquid L2 in the inner side 42a can be drained easily. Likewise, the hydraulic oil L1 will also be drained easily as air flows into the space B.

The filtration device 10 can simultaneously vent air G1 and air G2 trapped in the space B and the inner side 42a of the filter element 40. Therefore, the time necessary to vent the air in the housing 20 is shortened.

Furthermore, when the hydraulic oil is drained out of the housing 20, since air can flow into the inside 42a of the inner tube 42 and the space B, the time necessary to drain the hydraulic oil in the housing 20 is shortened.

Moreover, since the plug 60 extends in one direction, a pull or a push of the plug 60 causes the plug 60 to move between the first position P1 and the second position P2. Therefore, the operations of the plug 60 are simple, whereby the operation efficiency improves.

Another embodiment of the filtration device 10 is described below with reference to FIG. 8 and FIG. 9. The same elements of the filtration device 10 according to the below-described embodiment as those in the embodiment described above will be given the same reference numbers and will not be explained.

In this alternative embodiment, the structure of the vent valve device 50 differs from that of embodiment described above. Specifically, the vent valve apparatus 50 of this alternative embodiment differs in that it has a positioning mechanism 80 and a holding mechanism 90.

Figure 8:
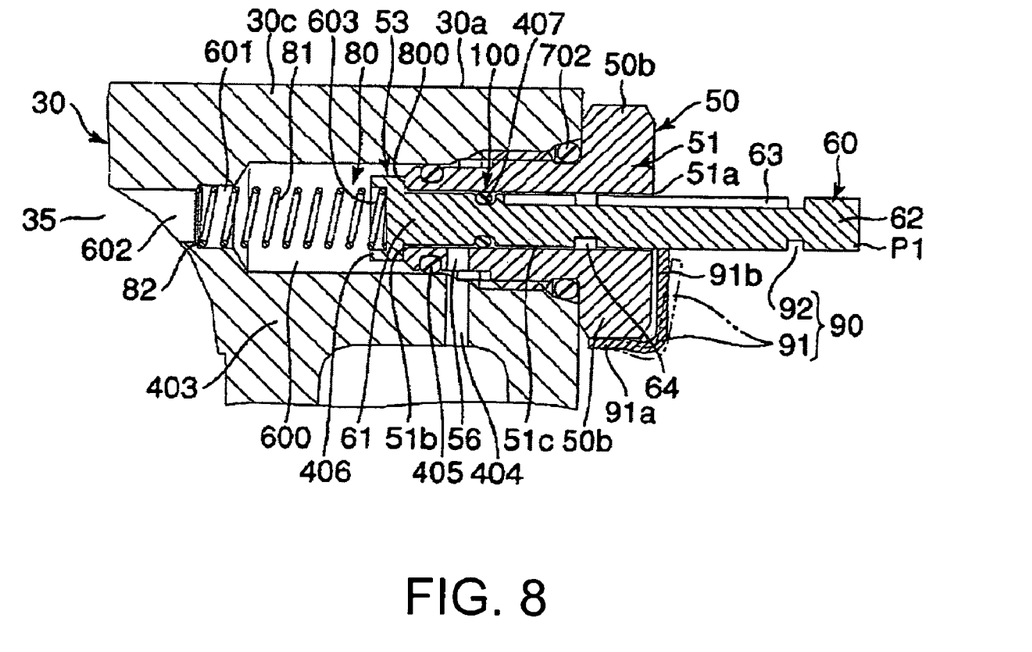
FIG. 8 is a cross sectional, enlarged view that illustrates the vent valve apparatus of another embodiment of the filtration device.

FIG. 8 is an enlarged cross sectional view illustrating the vent valve apparatus 50 of the filtration device 10. In FIG. 8, the plug 60 is in the first position P1. FIG. 9 is a cross section view taken when plug 60 is in the second position P2.

Figure 9:
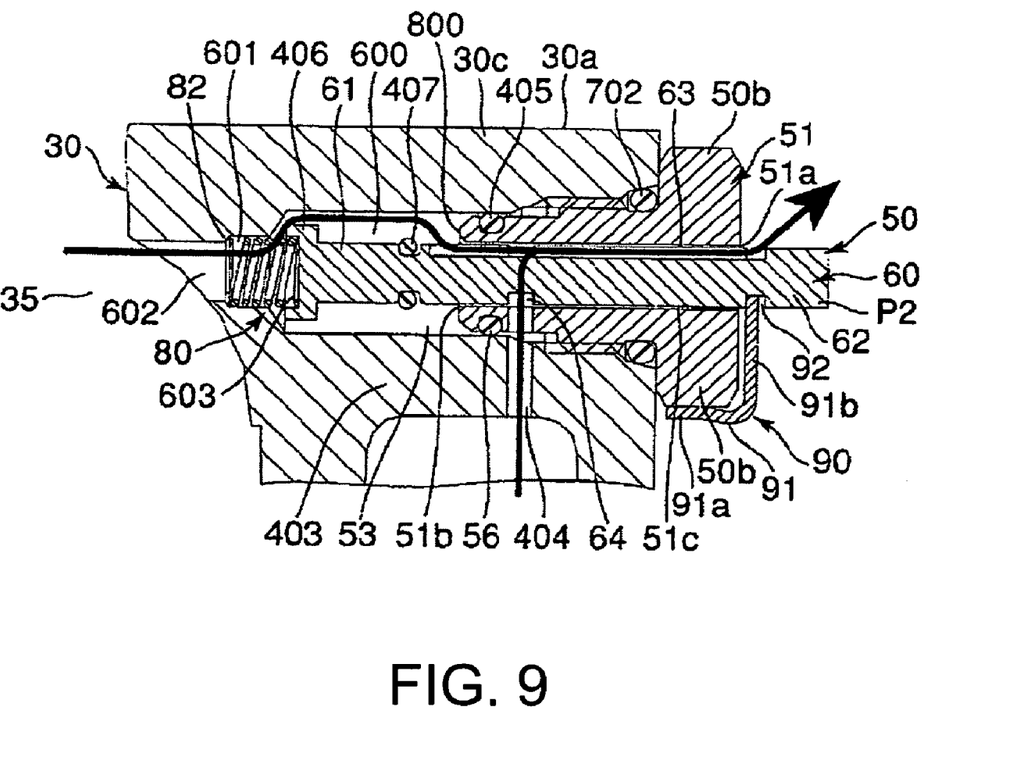
FIG. 9 is a cross sectional view that illustrates the plug being in the second position P2 as illustrated in FIG. 8.

As shown in FIGS. 8 and 9, the vent valve apparatus 50 is equipped with the positioning mechanism 80. The positioning mechanism 80 is comprised of a coil spring 81, a step 82, a spring support hole 603, a stopper 406 and a second opening side surface 800. The coil spring 81 constitutes a urging member of the present invention.

Step 82 will be further explained. The receiving hole 53 has a first part 600, a second part 601 and a third part 602. The first part 600 is a part of the receiving hole 53 which receives the body 51. The second part 601 is a part of the receiving hole 53 next to the first part 600. The second part 601 is narrower in diameter than the first part 600. The second diameter part 601 extends in the sliding direction to the plug 60.

The third part 602 of the receiving hole 53 is located on the other side of the first part 600 from the second part 601. The third part 602 communicates with the outflow passage 35. The third part 602 is narrower in diameter than the second part 601. Therefore, the step 82 is formed in the inner surface of the receiving hole between the second part 601 and the third part 602.

A spring support hole 603 is formed in the stopper part 406 of the plug 60. The spring support hole 603 is dented in the sliding direction of the plug 60.

One end of the coil spring 81 is received in the spring support hole 603 to thereby be supported by the plug 60. The other end of the coil spring 81 is received in the second part 601 to thereby be supported by the head 30.

By arranging the coil spring 81 as described above, the coil spring 81 is put in between the step 82 and the stopper section 406. Thus, the plug 60 is urged by the elasticity of the coil spring 81 from the first position P1 towards the second position P2 and is positioned by the stopper part 406 abutting against the second opening side surface 800. As used herein, the stopper part 406 constitutes a first contact section of the present invention. The second opening side surface 800 constitutes a second contact section of the present invention.

A retention mechanism 90 is comprised of a retention member 91 and a groove 92. The retention member 91 has a main part 91a and an engaging part 91b. The main part 91a is affixed on the outer surface of the stopper part 50b. The engaging part 91b is bent in an L-shape towards the body 91a and extends towards the plug 60 going around the body 51.

A groove 92 is formed in the outer periphery of the plug 60. The engaging part 91b fits into the groove 92. As illustrated in FIG. 9, the groove 92 is arranged so that the engaged part 91b engages with the groove 92 when the plug is in the second position P2. The plug 60 is retained in the second position P2 by the engaged part 91b when engaged with the groove 92.

As show by the broken lines in FIG. 8, the body part 91a has elasticity so that the engaging part 91b can be released from the groove 92. Because of this construction, when plug 60 is returned to the first position P1, the engaging part 91b is removed from the groove 92 by bending the body 91a as shown in the dash lines in the figure.

When the engaging part 91b comes out of the groove 92, the plug 60 is urged by the coil spring 81 towards the first position P1.

In this alternative embodiment, since the filtration device 10 has the positioning mechanism 80, the plug 60 can be positioned in the first position P1 when utilizing filtration device 10. Furthermore, since the positioning mechanism 80 uses the coil spring 81, the plug 60 can be pressed to move the plug 60 to the second position P2. Accordingly, the operation of draining the hydraulic oil L1 and L2 becomes efficient.

Moreover, since the filtration device 10 has the retention mechanism 90, the plug 60 can be retained in the second position P2. Thereby, the operation of venting and draining the air G1 and G2 and the hydraulic oil L1 and L2 in the housing 20 becomes efficient.

Furthermore, since the retention mechanism 90 uses simple means such as the retention member 91 and the groove 92, the filtration device 10 becomes less costly.

We claim:

1. A filtration device comprising:
 a housing body having a closed end and an open end;
 a filter element placed in the housing body for filtration of a fluid, the filter element defining inside the housing body an inflow space into which the fluid flows for filtration and an outflow space in which the filtered fluid flows from the inflow space through the filter element;
 a head for closing the open end of the housing body to retain the filter element inside the housing body, the head comprising an inlet passage being in communication with the inflow space, an outlet passage being in communication with the outflow space and a third passage being in communication with both the inlet passage and the outlet passage and being open to the outside of the filtration device,
 wherein the third passage is formed in the head along an axis and comprises a first opening formed for communication with one of the inlet and outlet passages, a second opening formed for communication with the other of the inlet and outlet passages, and a third opening formed at one axial end of the third passage for communication with the outside of the filtration device;
 a sleeve securely placed in the third passage and formed with an axial passage therethrough having an outer opening being open to the outside of the filtration device through the third opening of the third passage and an inner opening being open inside the third passage to the first opening of the third passage, wherein the axial passage is formed with a communication passage communicating the axial passage with the second opening of the third passage; and
 a plug having an axial length and inserted in the axial passage of the sleeve such that the plug is slidable in the axial passage of the sleeve between a first position where the plug closes the inner opening and the communication passage of the sleeve to thereby isolate the first and second openings of the third passage from each other and from the outside of the filtration device, and a second position where the plug opens the inner opening and the communication passage of the sleeve to thereby communication the first and the second openings of the third passage with each other and with the outside of the filtration device through the outer opening of the sleeve,
 wherein the plug comprises an axial groove in its circumference formed partially along the axial length of the plug such that the axial groove is in communication with the outside of the filtration device through the outer opening of the sleeve, regardless of whether the plug is in the first or second position, while the axial groove is retracted inside the sleeve out of communication with the first opening of the third passage when the plug is in the first position, whereas the axial groove is exposed inside the sleeve from the inner opening of the plug to communicate the first opening of the third passage with the outside of the filtration device when
 the plug is in the second position, and the plug further comprises a circumferential groove formed to intersect with the axial groove such that the circumferential groove is situated inside the plug in communication with the outside the filtration device through the axial groove, regardless of whether the plug is in the first or second position, and the circumferential groove is out of alignment with the communication passage of the sleeve and thus out of communication with the second opening of the third passage when the plug is in the first position, whereas the circumferential groove is in alignment with the communication passage of the sleeve to communicate the second opening of the third passage with the outside the filtration device through the axial groove when the plug is in the second position.

2. The filtration device of claim 1, wherein the filtration device further comprises a positioning mechanism that positions the plug into the second position.

3. The filtration device of claim 2, wherein the positioning mechanism comprises:
 an urging member that urges the plug from the second position towards the first position;
 a first contact section provided in the plug; and,
 a second contact section provided in the body, wherein the second contact section is in contact with the first contact section in an urging direction of the urging member when the plug is in the first position.

4. The filtration device of claim 3, wherein the filtration device further comprises a retention mechanism that retains the plug in the second position when the plug is in the second position.

5. The filtration device of claim 4, wherein the retention mechanism comprises:

a groove formed in the plug; and, an engaged section that is provided in the body and detachably received in the groove.

* * * * *

UNITED STATES PATENT AND TRADEMARK OFFICE
CERTIFICATE OF CORRECTION

PATENT NO.       : 7,661,539 B2                                                Page 1 of 1
APPLICATION NO. : 11/592796
DATED            : February 16, 2010
INVENTOR(S)      : Komine et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 444 days.

Signed and Sealed this

Thirtieth Day of November, 2010

David J. Kappos
*Director of the United States Patent and Trademark Office*